(12) United States Patent
Paycher

(10) Patent No.: US 11,723,087 B2
(45) Date of Patent: Aug. 8, 2023

(54) ESTABLISHING A SHORT-RANGE COMMUNICATION PATHWAY

(71) Applicant: Apple Inc., Cupertino, CA (US)

(72) Inventor: Alon Paycher, Beit Hananya (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/652,369

(22) Filed: Feb. 24, 2022

(65) Prior Publication Data

US 2022/0191953 A1 Jun. 16, 2022

Related U.S. Application Data

(63) Continuation of application No. 16/948,048, filed on Aug. 28, 2020, now Pat. No. 11,284,452, which is a continuation of application No. 16/529,485, filed on Aug. 1, 2019, now Pat. No. 10,764,941, which is a continuation of application No. 15/718,221, filed on Sep. 28, 2017, now Pat. No. 10,375,741.

(51) Int. Cl.
*H04W 76/10* (2018.01)
*H04W 68/02* (2009.01)
*H04W 4/80* (2018.01)
*H04R 1/10* (2006.01)
*H04W 84/12* (2009.01)

(52) U.S. Cl.
CPC .......... *H04W 76/10* (2018.02); *H04R 1/1016* (2013.01); *H04W 4/80* (2018.02); *H04W 68/02* (2013.01); *H04R 1/1041* (2013.01); *H04R 2420/07* (2013.01); *H04W 84/12* (2013.01)

(58) Field of Classification Search
CPC ....... H04W 76/10; H04W 4/80; H04W 68/02; H04W 84/12; H04R 1/1016; H04R 1/1041; H04R 2420/07
See application file for complete search history.

(56) References Cited

U.S. PATENT DOCUMENTS 11,284,452 B2 * 3/2022 Paycher ............... H04R 1/1016

\* cited by examiner

*Primary Examiner* — Myron Wyche
(74) *Attorney, Agent, or Firm* — Fay Kaplun & Marcin, LLP

(57) ABSTRACT

Exemplary embodiments include a system having a first device and a second device that are configured to establish a connection via a short-range protocol. The first and second devices perform an advertisement process to automatically identify that the first and second devices are capable of establishing the connection, the advertisement process comprising one of the first device or second device broadcasting an advertisement and the other one of the first device or the second device scanning for the advertisement, wherein, upon the first and second devices identifying that they are capable of establishing the connection, the first and second devices perform a paging mechanism to establish the connection, the paging mechanism comprising one of the first device or the second device transmitting a page and the other one of the first device or the second device scanning for the page, wherein the page triggers an operation to establish the connection.

20 Claims, 8 Drawing Sheets

US 11,723,087 B2

ESTABLISHING A SHORT-RANGE COMMUNICATION PATHWAY

BACKGROUND INFORMATION

A short-range communication protocol enables a short-range communication to be exchanged between two or more devices. Specifically, a short-range connection may be established between these devices. One manner for a device to establish the short-range connection is for a user to manually link to a further device by selecting this further device. For example, devices that are capable of establishing the short-range connection may broadcast an identification (or identifier). The device of the user may list the available devices that are broadcasting the identification for the user to select one or more of these available devices to establish the short-range connection. However, although this manual approach may provide significant control to the user, establishing the short-range connection in this way may also require a substantial amount of time (e.g., minutes). There may be instances where a more rapid establishment of the short-range connection is preferred for a better user experience.

To provide faster establishment of the short-range connection, an automated approach may also be used. Specifically, when two components are paired (e.g., audio buds), the automated approach may be used (in contrast to a source to device connection which utilizes the manual approach). While a device is not using a short-range connection or if configured to detect available further devices capable of establishing the short-range connection, the device may utilize a detection protocol. For example, when the short-range connection is based on a Bluetooth configuration, the detection protocol may be a paging protocol in which a Bluetooth page is broadcast at predetermined time intervals and a Bluetooth page scan operation is also performed at predetermined time intervals. Upon receiving a page during a scan or acknowledgement that a page was received, the devices may establish the short-range connection. However, those skilled in the art will understand that the predetermined time intervals involved with these operations may also require a relatively significant amount of time. For example, with Bluetooth, the short-range connection may require up to seconds (e.g., from 2 to 10 seconds). When streaming services or other time sensitive operations require the short-range connection in a more timely manner, the amount of time needed in establishing the short-range connection may result in a poor user experience.

SUMMARY

Some exemplary embodiments are directed to a method performed by a first device configured to establish a connection over a short-range connection with a second device. The method includes performing an advertisement process to automatically identify when the first device is capable of establishing the short-range connection with the second device, the advertisement process comprising the first device scanning for an advertisement broadcast by the second device and when the first device has identified the second device via the advertisement process, performing a paging mechanism comprising the first device transmitting a page to the second device during an interval in which the first device expects the second device to be scanning for the page, wherein an exchange of the page triggers a connection operation to establish the short-range connection Some other exemplary embodiments are directed to a method performed by a first device configured to establish a connection via a short-range communication protocol with a second device. The method includes performing an advertisement process to automatically identify when the first device is capable of establishing the connection with the second device, the advertisement process comprising the first device broadcasting an advertisement to be received by the second device and initiating a scanning mechanism, by the first device, to detect a page from the second device, wherein the page triggers a connection operation to establish the connection.

Still other exemplary embodiments are directed to a system including a first device and a second device, the first and second devices configured to establish a connection via a short-range protocol. The first and second devices perform an advertisement process to automatically identify that the first and second devices are capable of establishing the connection, the advertisement process comprising one of the first device or second device broadcasting an advertisement and the other one of the first device or the second device scanning for the advertisement, wherein, upon the first and second devices identifying that they are capable of establishing the connection, the first and second devices perform a paging mechanism to automatically establish the connection, the paging mechanism comprising one of the first device or the second device transmitting a page and the other one of the first device or the second device scanning for the page, wherein an exchange of the page triggers a connection operation to establish the connection.

DETAILED DESCRIPTION

Figure 1:
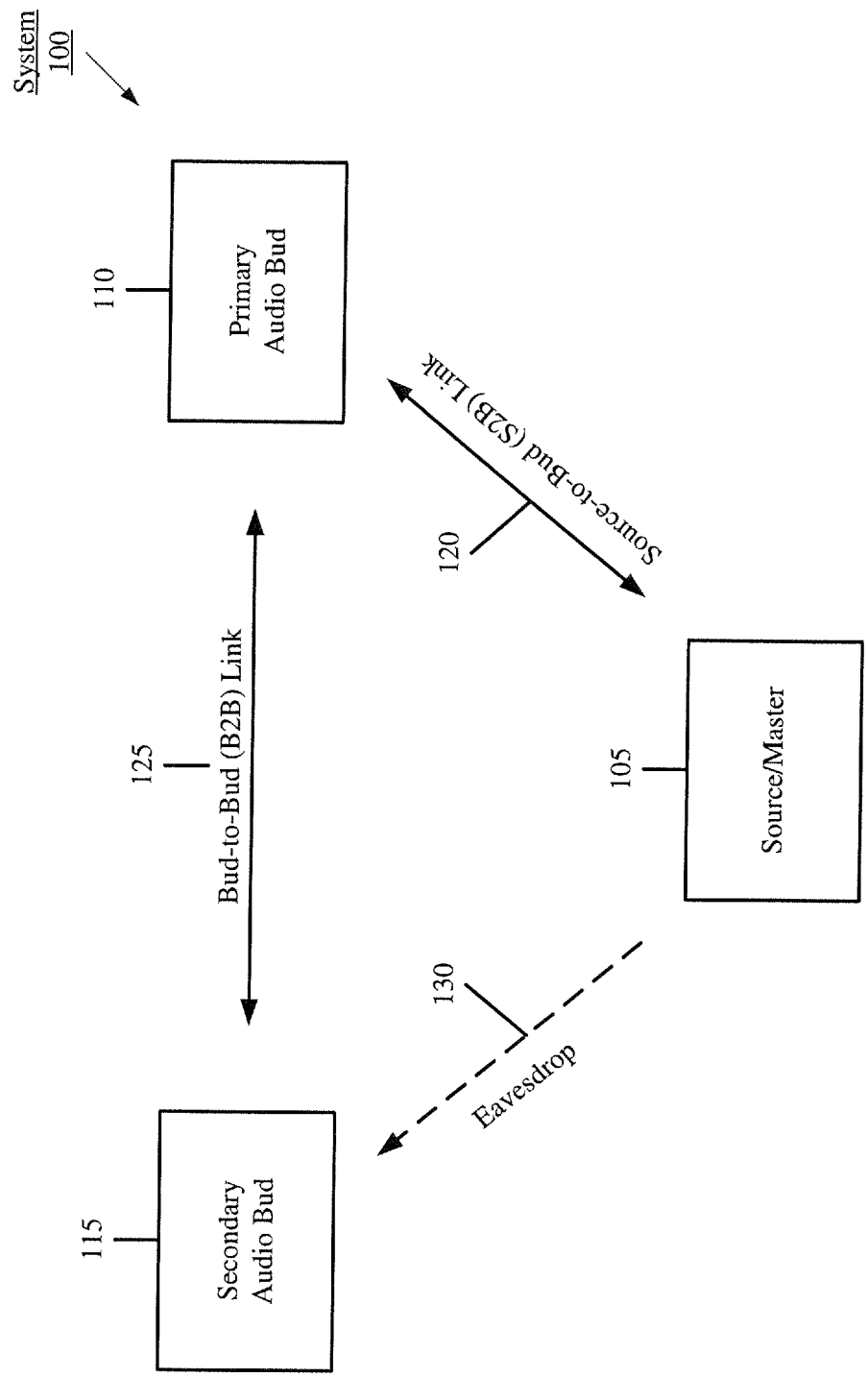
FIG. 1 shows an example system of components utilizing short-range connections according to various exemplary embodiments described herein.

The exemplary embodiments may be further understood with reference to the following description and the appended drawings, wherein like elements are referred to with the same reference numerals. The exemplary embodiments describe a device, system, and method to automatically and rapidly establish a short-range connection. The exemplary embodiments incorporate a lower power advertising scheme so that devices capable of establishing the short-range connection may be readily identified. Thereafter, the exemplary embodiments may utilize a rapid connection procedure that performs the operations used in establishing the short-range connection in a more frequent manner. Accordingly, the exemplary embodiments provide mechanisms whereby a short-range connection may be established in a relative short amount of time (compared to conventional approaches).

It should be noted that the exemplary embodiments are described herein with regard to establishing a short-range connection using an advertising scheme, particularly a Bluetooth connection. However, the use of the Bluetooth connection is only exemplary and the Bluetooth connection may represent (and/or be replaced by) any short-range connection. Furthermore, the use of a short-range connection is also only exemplary and the exemplary embodiments may be used or modified for any type of connection between two or more devices (e.g., a medium- or long-range connection). It should also be noted that the exemplary embodiments, as described herein, include an advertising scheme that relates to broadcasting an identification and a scanning operation to detect the broadcast identification/identifier. However, the use of this type of advertising scheme is only exemplary and the exemplary embodiments may be used or modified for any lower power, fast detecting identification scheme.

Wireless communication systems and protocols are being developed to further increase the types of usage and the types of devices that may be connected in this manner. One type of wireless communication system may utilize a personal area network ("PAN") that may be defined as a computer network used for data transmission amongst a plurality of devices. For example, a PAN may be used for communications between the devices themselves (e.g., interpersonal communication), or for connecting one or more devices to a higher-level network and the Internet via an uplink, wherein one "master" device may assume the responsibility of performing the operations associated with a router. Furthermore, a wireless PAN may be a network for interconnecting devices using short-range wireless technologies, such as Bluetooth.

Within the wireless PAN, certain applications or operations may be considered to require a relatively high power usage while others may be considered to require a relatively low power usage. Similarly, certain applications or operations may be considered to require a relatively large amount of time while others may be considered to require a relatively small amount of time. For example, with regard to a Bluetooth connection, relatively speaking, a Bluetooth paging/scan operation may utilize both more power and more time than a Bluetooth advertising scheme. The Bluetooth paging/scan operations may be based on the Bluetooth protocol that defines how the Bluetooth connection operations are performed. The Bluetooth advertising scheme may relate to a protocol in which low energy application profiles send and receive short pieces of data over a low energy link. The profiles may provide standards, which manufacturers follow to allow devices to use specific technologies, such as Bluetooth, in the intended manner. This advertising scheme has been defined as Bluetooth low energy (hereinafter referred to as "BLE") or "Bluetooth Smart" which is a wireless PAN technology designed and marketed by the Bluetooth Special Interest Group aimed at applications in the healthcare, fitness, location, beacons, security, and home entertainment industries. As noted above, compared to Classic Bluetooth (or Bluetooth Classic) that includes the Bluetooth paging/scan operations, BLE is intended to provide considerably reduced power consumption and cost while maintaining a similar communication range as well as reducing a time used by Bluetooth devices to identify proximity and capability of establishing a Bluetooth connection.

The exemplary embodiments are configured to perform the Bluetooth connection operations associated with Classic Bluetooth in a more efficient manner, particularly with respect to time. Thus, when the Bluetooth connection is to be established while a time sensitive application requires the Bluetooth connection, the mechanism according to the exemplary embodiments may perform the necessary operations for devices to discover one another, exchange the necessary information between these devices, and subsequently establish the Bluetooth connection for the devices within a reasonable amount of time that a use experience is not impacted. By utilizing the mechanism according to the exemplary embodiments, the time required to establish the Bluetooth connection may be significantly reduced compared to relying on only the operations of Classic Bluetooth.

FIG. 1 shows a system 100 of components utilizing short-range connections according to the exemplary embodiments. The system 100 illustrates a possible network of short-range connections among a source device 105, a primary audio bud 110, and a secondary audio bud 115. That is, the system 100 shows when the short-range connections have been established. However, as the exemplary embodiments are directed to establishing the short-range connections, the system 100 may not include the illustrated short-range connections. A first short-range connection that may be established may be between the source device 105 and the primary audio bud 110 via a source-to-audio bud (S2B) link 120. A second short-range connection that may be established may be between the primary audio bud 110 and the secondary audio bud 115 via an audio bud-to-audio bud (B2B) link 125. The secondary audio bud 115 may also be configured to perform an eavesdrop 130 (or snoop) on data being exchanged on the S2B link 120 or being broadcast/transmitted by the source device 105. It is noted that the system 100 may also include a third short-range connection between the source device 105 and the secondary audio bud 115 (not shown). As noted above, in one example, the short-range connections may be Bluetooth connections.

It is noted that under conventional approaches (e.g., as defined by Classic Bluetooth protocols), the S2B link 120 may be established using a manual approach in which a user manually selects a device. In contrast, the B2B link 125 may be established using an automated approach in which proximity detection and/or the capability of establishing the B2B link 125 is constantly being performed (e.g., at predetermined intervals). As will be described in detail below, both the S2B link 120 and the B2B link 125 may be stablished using an automated approach according to the mechanism of the exemplary embodiments.

The source device 105 may be any electronic device capable of establishing the S2B link 120. For example, the source device 105 may be a mobile device (e.g., a mobile computing device, a mobile phone, a tablet computer, a personal computer, a VoIP telephone, a tablet, a personal digital assistant, a wearable, a peripheral, an Internet of Things (IoT) device, etc.) or a stationary device (e.g., a desktop terminal). The primary audio bud 110 and the secondary audio bud 115 may be any wireless audio output component (e.g., ear buds, wireless headphones, etc.). However, it is noted that the use of audio buds is only exemplary. The exemplary embodiments may be used to establish a short-range connection between any type(s) of device. Thus, the primary audio bud 110 and the secondary audio bud 115 may represent any electronic device including the above noted types for the source device 105 as well as other types (e.g., an accessory device). For example, the primary audio bud 110 and the secondary audio bud 115 may also be Bluetooth-enabled hands-free headsets, wireless speakers, intercoms, fitness tracking devices, sensors, automobile sound systems, etc.

In the system 100, the source device 105 and the primary audio bud 110 may have a master/slave relationship over the S2B link 120. Specifically, the source device 105 may be a master component while the primary audio bud 110 may be a slave component. Similarly, the primary audio bud 110 and the secondary audio bud 115 may have a master/slave (or primary/secondary) relationship over the B2B link 125. Specifically, the primary audio bud 110 may be a master component while the secondary audio bud 115 may be a slave component. However, it is noted that the master/slave relationship is only exemplary. According to another exemplary embodiment, the components connected via the short-range connections may have a mutual relationship where neither component has a priority (e.g., sharing an equal priority) or neither component has predetermined operations that must be performed (e.g., the predetermined operations may have shared or the duty to perform may be shared). In yet another exemplary embodiment, the master/slave relationship may be dynamically set. For example, if the primary audio bud 110 is initially set as the master component while the secondary audio bud 115 is initially set as the slave component, but conditions change such that the secondary audio bud 115 maintains a connection with the source device 105 or has a better short-range connection to the source device 105, the secondary audio bud 115 may become the master component while the primary audio bud 115 may become the slave component. It is also noted that the system 100 may include one or more other devices that may also be present in either or both of the S2B link 120 or the B2B link 125, or another connection with any of the devices of the system 100.

Figure 2:
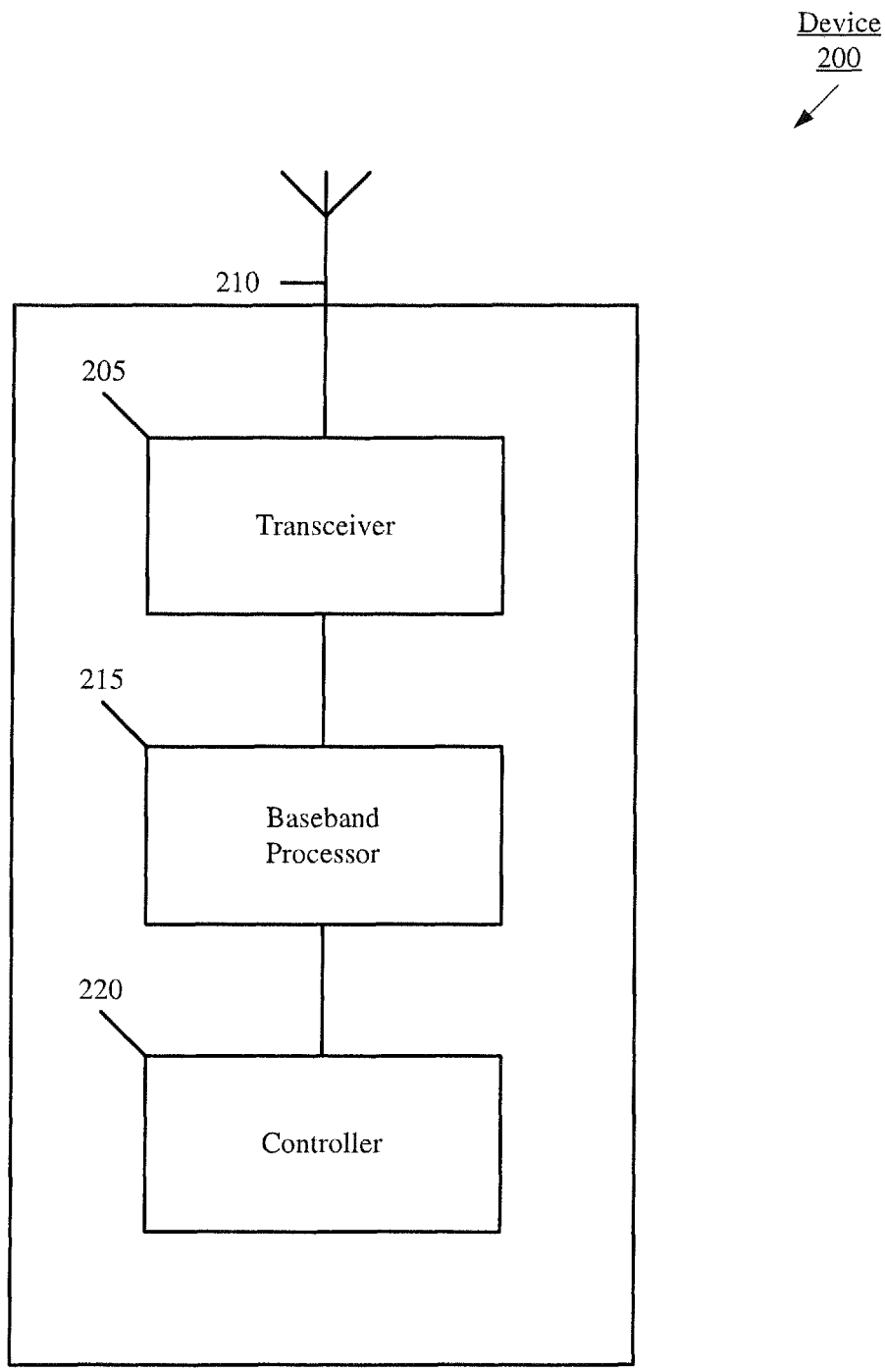
FIG. 2 shows an example device for establishing a short-range connection according to various exemplary embodiments described herein.

In establishing the short-range connections (e.g., the S2B link 120 or the B2B link 125), the source device 105, the primary audio bud 110, and the secondary audio bud 115 may include the necessary hardware, software, and/or firmware to perform conventional operations as well as operations according to the exemplary embodiments. FIG. 2 shows a device 200 for establishing a short-range connection according to the exemplary embodiments. The device 200 may represent any of the source device 105, the primary audio bud 110, and the secondary audio bud 115. Specifically, the device 200 may represent the components that may be included to perform the conventional operations and the operations according to the exemplary embodiments.

The device 200 may include a transceiver 205 connected to an antenna 210, a baseband processor 215, and a controller 220, as well as other components (not shown). The other components may include, for example, a memory, a battery, ports to electrically connect the device 200 to other electronic devices, etc. The transceiver 205 may be configured to exchange data over one or more connections. Specifically, the transceiver 205 may enable a short-range connection to be established using frequencies or channels associated with the short-range connection (e.g., the channels associated with a Bluetooth connection). The controller 220 may control the communication functions of the transceiver 205 and the baseband processor 215. In addition, the controller 220 may also control non-communication functions related to the other components, such as the memory, the battery, etc. Accordingly, the controller 220 may perform operations associated with an applications processor.

The baseband processor 215 may be a chip compatible with a wireless communication standard, such as Bluetooth. The baseband processor 215 may be configured to execute a plurality of applications of the device 200. For example, the applications may include the methods and operations related to the exemplary embodiments where the short-range connection is to be established using an advertising scheme and performing corresponding connection operations. Additionally, the transceiver 205 may also be configured to execute a plurality of applications of the device 200. For example, the applications may include the methods and operations related to the exemplary embodiments.

According to the exemplary embodiments, the source device 105, the primary audio bud 110, and the secondary audio bud 115 may be configured to utilize a Bluetooth paging scheme. As those skilled in the art will understand, the Bluetooth paging scheme may be defined by Classic Bluetooth protocols. For example, the Bluetooth paging scheme may include a plurality of operations including a paging operation (hereinafter "BT page" operation) and a page scanning operation (hereinafter "BT page scan" operation). As will be described in further detail below, the exemplary embodiments may incorporate the Bluetooth paging scheme as defined by Classic Bluetooth protocols or may incorporate a modified Bluetooth paging scheme according to the exemplary embodiments which may include a more aggressive approach in resolving pages. Specifically, the modified Bluetooth paging scheme may be a fast connect scheme using a rapid connection procedure (which is described in further detail below).

The BT page operation may involve broadcasting a page that identifies a device prepared to establish the Bluetooth connection. The BT page operation may be performed at various time intervals. Upon entering a page state, the device may begin transmitting the page. For example, based on channels being used by a paged device, the paging device may use a portion of these channels to transmit the page. In a particular scenario, the paged device may use 32 channels and the paging device may use 16 of these channels. As will be described below, the paging device may be aware of the channels being used by the paged device from an advertisement that was previously received. According to Classic Bluetooth protocols, during every even numbered slot, the paging device may transmit two identification packets on two different channels. During the following slot, the paging device may listen on two different channels for the response (also an identification packet) from the paged device. In the next two slots, the paging device may use the next two channels. In this manner, the hopping sequence of transmitting a page and listening for a response in the paging operations may repeat for a time interval. In the embodiment where 32 channels are used, this may repeat every 10 ms. The paging device may repeat the sequence for as long as necessary for the paged device to have entered the page scan state where the page scanning operations are performed. For example, based on the page scan modes, the pages may be transmitted at least once (R0), at least 128 times (R1), or at least 256 times (R2). For illustrative purposes, the exemplary embodiments are described herein with regard to the R1 page scan mode that lasts for 1.28 seconds. It is noted that if the paging device does not receive a response, the paging device may then try another portion or remaining portion of the channels being used by the paged device.

The BT page scan operation may involve listening for a page from a device prepared to establish a Bluetooth connection. The BT page scan operation may also be performed at various intervals. A Bluetooth device that is not currently connected to another Bluetooth device over a Bluetooth connection periodically enters a page scan state. In the page scan state, the unconnected device activates a receiver (e.g., of the transceiver 205) and listens for a paging device that might be trying to page the device. As noted above, the unconnected device may operate in one of three page scan modes: R0, R1, and R2. Again, for illustrative purposes, the exemplary embodiments are described with regard to the R1 scan mode. During the page scan state, the unconnected device may listen on one of the Bluetooth channels being used by the unconnected device for a duration of time every time interval defined by the page scan mode. For example, in the R1 scan mode, the unconnected device may scan a channel for a page for 11.25 ms every 1.28 seconds. This process may repeat for each Bluetooth channel.

In view of the manner in which the Bluetooth paging scheme operates and the timing of the operations in the Bluetooth paging scheme, even under ideal conditions where the correct channel is scanned at the time that a page is being transmitted, the paging scheme may still require several seconds for the Bluetooth connection to be established. For example, based purely on the Bluetooth paging scheme, the Bluetooth connection may require two to three seconds to be established. Thereafter, additional time may be required for the data to be transmitted and processed. For example, with audio buds, additional time may be needed for audio to eventually be output. Under less ideal conditions, the paging scheme and eventual use of the Bluetooth connection (e.g., output of sound) may require up to ten seconds. Those skilled in the art will understand that this amount of time may be unacceptable and result in a poor user experience. For example, if a Bluetooth capable ear piece (e.g., primary audio bud 110) were unconnected to a mobile device (e.g., source device 105) and an incoming call is answered, the amount of time that is currently required to connect the ear piece to the mobile device may be too great. There are also other time sensitive applications that require a more rapid Bluetooth connection to be established such as streaming services, particularly when the system includes two audio buds and only one audio bud is outputting sound. In view of these scenarios, the exemplary embodiments are configured to establish the Bluetooth connection in a more timely manner to reduce the overall time required for the Bluetooth capable device to be used.

As will be described in further detail below, two exemplary scenarios will be described in which the exemplary embodiments may provide a more rapid establishment of the Bluetooth connection. In a first scenario, the exemplary embodiments may enable a more rapid B2B link 125 to be established. In a first example relating to the first scenario, a user may answer an incoming call by providing an input on the source device 105. The primary audio bud 110 may already be connected to the source device 105 over the S2B link 120. Thus, alternatively, the user may answer the incoming call by providing an input on the primary audio bud 110. The secondary audio bud 115 may not be connected to the primary audio bud 110 over the B2B link 125 because the secondary audio bud 115 is not being used for voice calls. In a second example relating to the first scenario, the secondary audio bud 115 may have been connected via the B2B link 125 but left in a location which cannot support maintaining the B2B link 125 (e.g., the user having the source device 105 and the primary audio bud 110 walked away from the location where the secondary audio bud 115 was left). In either case, the secondary audio bud 115 is an unconnected Bluetooth device. If the user with the source device 105 and the primary audio bud 110 were to be located where the B2B link 125 may be re-established (e.g., the user comes back to where the secondary audio bud 115 is located and places the secondary audio bud 115 in the user's ear), the process of establishing the B2B link 125 using the Bluetooth paging scheme may require the aforementioned time. With the call being performed in real time, the user may not be using the secondary audio bud 115 until after the requisite time. Thus, the exemplary embodiments may enable the secondary audio bud 115 to be used in a more efficient and timely manner.

In a second scenario, the exemplary embodiments may enable a more rapid S2B link 120 to be established. The S2B link 120 may also be established using an automated approach. For example, a user may have a plurality of source devices 105 that may provide data to the primary audio bud 110 and/or the secondary audio bud 115. However, the primary audio bud 110 may only establish one S2B link 120. For example, the audio buds 110, 115 may output audio based on data received from the source device 105. The user may have placed the audio buds 110, 115 in the user's ears. The source device 105 currently connected to the primary audio bud 110 over the S2B link 120 may be a laptop computer that is streaming music. At a later time, in a first instance, the user may select a tablet to play a video with accompanying audio. In a second instance, the user may receive an incoming call on a mobile phone. In either case, the only mechanism available to the user to disconnect the current S2B link 120 between the audio buds 110, 115 and the laptop source device 105 is to manually connect to the tablet (in the first instance) or the mobile phone (in the second instance). The exemplary embodiments may enable the S2B link 120 to be established in a more efficient and timely manner as well as in an automated manner.

According to the exemplary embodiments, the source device 105, the primary audio bud 110, and the secondary audio bud 115 may utilize an advertising scheme. Specifically, the advertising scheme according to BLE may be incorporated into the process of establishing the Bluetooth connection. The advertising scheme may provide a first aspect to establishing the Bluetooth connection. The advertising scheme may enable devices to identify one another in preparation for establishing the Bluetooth connection. In using the advertising scheme, the source device 105, the primary audio bud 110, and the secondary audio bud 115 may broadcast an advertisement and also listen for advertisements. The advertisements may provide different types of information. For example, the advertisement may be indicative of a proximity such that when the distance is less than a predetermined threshold, the Bluetooth connection is capable of being established. In another example, the advertisement may be indicative of a capability of the Bluetooth connection being established. In a further example, the advertisement may include an identification of the Bluetooth capable device. In yet another example, as noted above, the advertisement may include other information such as Bluetooth channels on which the identified device operates.

Those skilled in the art will understand that the advertisement scheme may be a lower power scheme that utilizes a low power connection. Specifically, the advertisement may be a relatively small data packet and the operations associated with the advertisement scheme may require a relatively low amount of power. Accordingly, the advertisement scheme may provide a lower power requirement relative to using only the Bluetooth paging scheme in establishing the Bluetooth connection according to the exemplary embodiments. Furthermore, the advertisement scheme may be used to prompt the BT page operation. As those skilled in the art will understand, the BT page operation may be a relatively power intensive operation. Thus, with the advertisement scheme providing an indication of when the BT page operation is to be used in a minimal manner, the advertisement scheme may further reduce power usage in establishing the Bluetooth connection according to the exemplary embodiments. In addition, as described in detail below, the advertisement scheme reduces the amount of time required to establish the Bluetooth connection.

It is noted that the advertisement being broadcast by the source device 105, the primary audio bud 110, and the secondary audio bud 115 may include data that has security features (e.g., being encrypted). In this manner, the security feature may ensure that only paired devices (e.g., between the primary audio bud 110 and the secondary audio bud 115) may decrypt and process the information. For example, the information that may be encrypted may be a current audio state of a device (e.g., streaming audio or idle), identification information related to any currently connected paired devices, etc.

The advertising scheme may include a plurality of operations. Specifically, the advertising scheme may include an advertisement broadcast operation (hereinafter "BLE advertisement" operation) and an advertisement scanning operation (hereinafter "BLE scan" operation). As will be described in detail below, by utilizing the advertising scheme according to BLE, a Bluetooth capable device may more readily identify when another Bluetooth capable device is within range of establishing the Bluetooth connection such that the Bluetooth paging scheme may be performed to establish the Bluetooth connection.

The BLE advertisement operation may involve broadcasting the advertisement at predetermined intervals. According to the exemplary embodiments, the predetermined intervals in which the BLE advertisement operation is performed may be less than the predetermined intervals that the BT page operation is performed. For example, the advertisement may be broadcast every 181 ms (or at any other regular or irregular interval).

The BLE scan operation may involve listening for broadcast advertisements at predetermined intervals. According to the exemplary embodiments, the predetermined intervals in which the BLE scan operation is performed may be less than the predetermined intervals that the BT page scan operation is performed. For example, the BLE scan operation may be performed for 10 ms every 100 ms (or any other suitable interval).

In view of the manner in which the advertisement scheme is performed and the timing of the operations, the source device 105, the primary audio bud 110, and the secondary audio bud 115 may be capable of identifying the presence of one another in a more timely manner. For example, the primary audio bud 110 may be capable of determining the presence of the secondary audio bud 115 in about 1.5 seconds. With negligible associated processing times and requiring approximately 100 ms to perform the Bluetooth paging scheme to establish the Bluetooth connection (as described in detail below), the exemplary embodiments may provide a more timely manner of establishing the Bluetooth connection when implemented for the B2B link 125 (e.g., halving the necessary time when using only the Bluetooth paging scheme). In another example, the source device 105 may be capable of determining the presence of the primary audio bud 110 in about 200 ms. Again, with negligible associated processing times and requiring approximately 100 ms to perform the Bluetooth paging scheme to establish the Bluetooth connection, the exemplary embodiments may provide a more timely manner of establishing the Bluetooth connection when implemented for the S2B link 120 (e.g., using only a fraction of the necessary time compared to that of a manual approach).

The advertisement scheme provides a mechanism whereby the source device 105, the primary audio bud 110, and the secondary audio bud 115 may identify the presence of one another. Once a pair of the Bluetooth capable devices identifies each other's presence, the exemplary embodiments may incorporate a fast connect scheme using a rapid connection procedure. When the fast connect scheme is determined to be used, the fast connect scheme may utilize operations substantially similar to the Bluetooth paging scheme. However, in contrast to the Bluetooth paging scheme, a more aggressive paging and/or scanning operation may be used. As described above, under the R1 page scan mode, the BT page operation may be performed 128 times over a 1.28 second time interval. Although current paging mechanisms allow for a page to be transmitted every 10 ms over the 1.28 second span, the exemplary embodiments may utilize a modified aggressive approach in which more pages may be transmitted over a shorter time interval. Accordingly, in a first manner of using the rapid connection procedure, the BT page operation may be modified with this more aggressive approach. According to the exemplary embodiments, the BT page scan operation may be modified to more aggressively listen for pages. As noted above, the R1 page scan mode may define that for every 1.28 second time interval, a scan is performed for 11.25 ms. In a second manner of using the rapid connection procedure, the BT page scan operation may be modified by incorporating more scans within a shorter time interval. For example, the R1 page scan mode may be modified such that for every 100 ms time interval, a plurality of scans of 11.25 ms may be performed. For illustrative purposes, the exemplary embodiments are described herein where in a single time interval for the BT page scan operation of 100 ms, two scans of 11.25 ms are performed. However, it is again noted that any number of additional scans may be performed.

Therefore, by utilizing the advertisement scheme described above, the exemplary embodiments provide a first manner in which a time required to establish the Bluetooth connection is reduced. Specifically, the time needed to identify when another Bluetooth capable device is within range of establishing the Bluetooth connection is reduced as the BLE advertisement operation and the BLE scan operation are performed in a more aggressive manner than the Bluetooth paging scheme. Furthermore, since the BT page operation is not required until the Bluetooth capable device has been identified, the power usage may also be reduced as the advertisement scheme is a low power operation. Therefore, on average, the identification process may be reduced significantly when considering the time needed for a manual approach or reduced relatively substantially when considering the time needed for an automated approach (e.g., half).

Furthermore, by utilizing the fast connect scheme, the exemplary embodiments provide a second manner in which a time required to establish the Bluetooth connection is reduced. Specifically, once identified, the time needed to perform the operations in establishing the Bluetooth connection may be reduced as a more aggressive BT page operation and/or a more aggressive BT page scan operation may be utilized. Therefore, on average, if twice the number of scans are performed within a common time interval, an average reduction of half the time may be achieved to establish the Bluetooth connection using the modified Bluetooth paging scheme according to the exemplary embodiments. Although the exemplary embodiments may be modified to incorporate one or both of these mechanisms, the combination of the advertisement scheme with the fast connect scheme may provide even more reduction in the time required to establish the Bluetooth connection either in the S2B link 120 or the B2B link 125.

Figure 3:
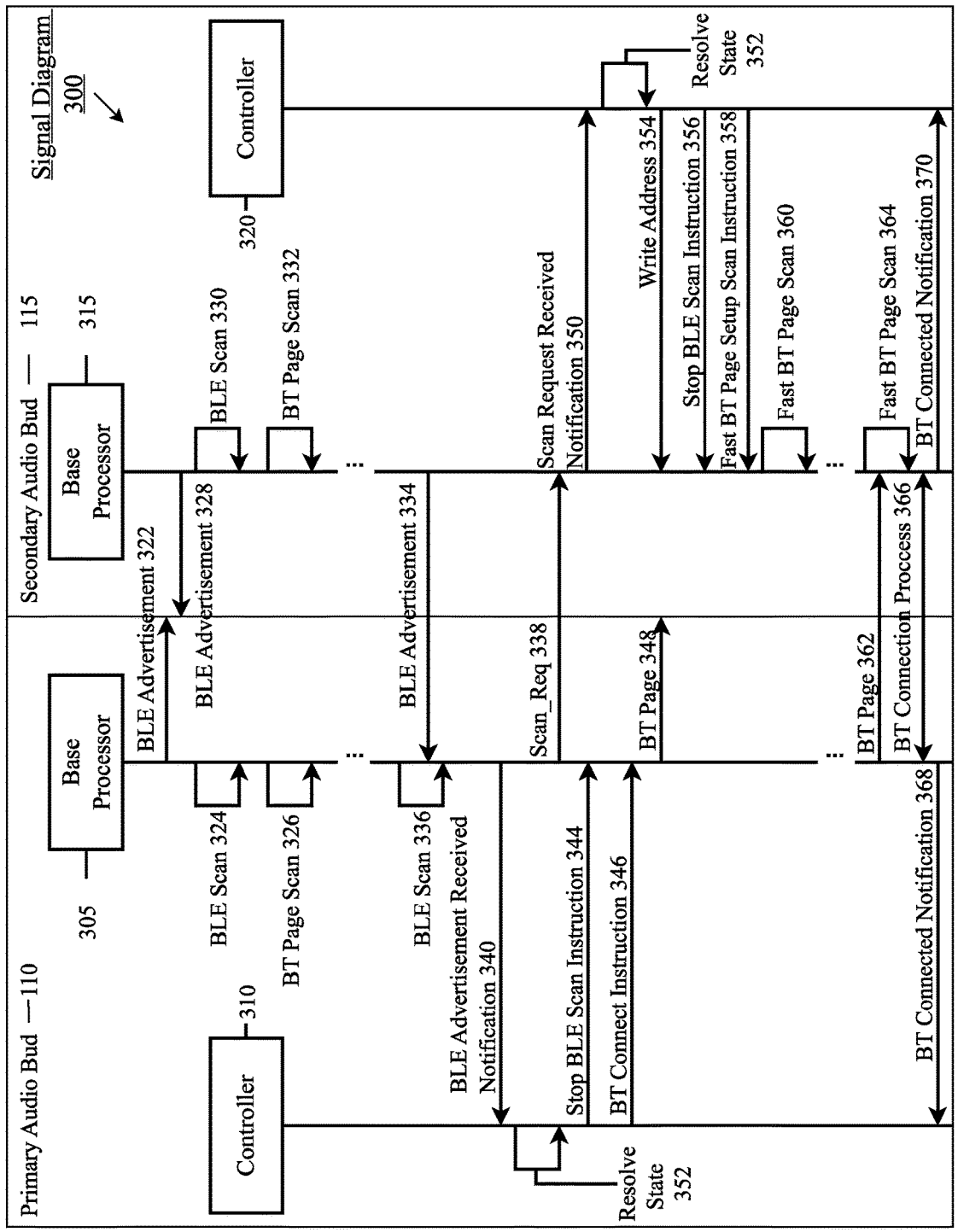
FIG. 3 shows a signal diagram for a first example scenario in which a short-range connection is to be established according to various exemplary embodiments described herein.

FIG. 3 shows a signal diagram 300 for the above noted example first scenario where a short-range connection is to be established according to the exemplary embodiments. As described above, one manner of utilizing the mechanism according to the exemplary embodiments is in establishing the B2B link 125 between the primary audio bud 110 and the secondary audio bud 115. A current B2B link 125 (e.g., a UTP connection) may not be established for any number of reasons (e.g., never had been established, was established but a change of conditions severed the connection such as too great a distance between the primary audio bud 110 and the secondary audio bud 115, etc.). At a subsequent time, the primary audio bud 110 and the secondary audio bud 115 may be capable of establishing the B2B link 125. When these conditions exist, the exemplary embodiments may be used to establish the B2B link 125 in a timely manner, particularly when time sensitive applications (e.g., streaming audio) are being used on the source device 105 (which has established the S2B link 120 with either the primary audio bud 110 or the secondary audio bud 115). For illustrative purposes, the exemplary embodiments are described where the S2B link 120 is between the source device 105 and the primary audio bud 110 and the B2B link 125 is to be established where the secondary audio bud 115 is an unconnected Bluetooth device. The exemplary embodiments are also described with regard to the primary audio bud 110 and the secondary audio bud 115 being paired Bluetooth devices.

As shown in the signal diagram 300, the primary audio bud 110 and the secondary audio bud 115 may each be represented with components thereof. For example, the primary audio bud 110 may be represented with the baseband processor 305 and the controller 310 while the secondary audio bud 115 may be represented with the baseband processor 315 and the controller 320. The baseband processor 305 and the baseband processor 315 may perform operations substantially similar to the baseband processor 215 described above for the device 200 of FIG. 2. The controller 310 and the controller 320 may perform operations substantially similar to the controller 220 described above for the device 200 of FIG. 2.

While the B2B link 125 is not established, the primary audio bud 110 and the secondary audio bud 115 may utilize the advertisement scheme. As noted above, the advertisement scheme includes low power operations such that a continued use while the B2B link 125 is not established may not be a significant burden on a limited power supply of each of the audio buds 110, 115. Thus, the primary audio bud 110 and the secondary audio bud 115 may each perform the BLE advertisement operation. Specifically, the BLE advertisement 322 may be broadcast by the primary audio bud 110 while the BLE advertisement 328 may be broadcast by the secondary audio bud 110. As noted above, the BLE advertisements 322, 328 may be broadcast every 181 ms. The primary audio bud 110 and the secondary audio bud 115 may each also perform the BLE scan operation. Specifically, the BLE scan 324 may be performed by the primary audio bud 110 while the BLE scan 330 may be performed by the secondary audio bud 115. As noted above, the BLE scans 324, 330 may be performed for 10 ms every 100 ms.

Since the B2B link 125 is not established, the primary audio bud 110 and the secondary audio bud 115 may also utilize a portion of the Bluetooth paging scheme. Since a page may be transmitted at any moment while the B2B link 125 is not established, the primary audio bud 110 and the secondary audio bud 115 may each perform the BT page scan operation. Specifically, the BT page scan 326 may be performed by the primary audio bud 110 while the BT page scan 332 may be performed by the secondary audio bud 115. As there has not been any identification of the presence of the audio buds 110, 115 by one another, the BT page scans 326, 332 may be performed as defined by Classic Bluetooth protocols. Specifically, under the R1 page scan mode, the BT page scans 326, 332 may be performed for 11.25 ms every 1.28 seconds.

It is noted that during the identification phase in which the advertisement scheme is being used by the primary audio bud 110 and the secondary audio bud 115, neither of these components may be utilizing the BT page operation. Although the BT page scan operation may be required to be used to listen for any page that may be transmitted, according to the exemplary embodiments, the BT page operation may only be used once the identification of another Bluetooth capable device is determined. As noted above, the BT page operation may utilize a relatively high amount of power and the component that performs the page may experience a dramatic power usage (which may result in an imbalanced energy consumption between the primary audio bud 110 and the secondary audio bud 115). Thus, to conserve power to only utilize the BT page operation when the probability of a transmitted page to be received, the exemplary embodiments may prevent the use of the BT page operation while the advertisement scheme is being used.

While the primary audio bud 110 and the secondary audio bud 115 are incapable of establishing the B2B link 125 (e.g., outside an operating proximity from one another), the above processes may continue without success. However, when the primary audio bud 110 and the secondary audio bud 115 are capable of establishing the B2B link 125 (e.g., coming within the operating proximity to each other), the above advertisement scheme may result in an advertisement being received resulting in the primary audio bud 110 and the secondary audio bud 115 identifying one another. For example, at a subsequent time, a BLE advertisement 334 may be broadcast by the secondary audio bud 115. The BLE advertisement 334 may be received by the primary audio bud 110 using a BLE scan 336. As noted above, once the primary audio bud 110 and the secondary audio bud 115 are capable of establishing the B2B link 125, the process of identifying one another may utilize a reduced amount of time. Specifically, an average identification time may be approximately 1.5 seconds.

Once the BLE advertisement 334 is received by the primary audio bud 110, a corresponding notification 340 may be exchanged between the baseband processor 305 and the controller 310. The primary audio bud 110 may also resolve a state 342 of between the secondary audio bud 115 and any source device to which it may be connected (e.g., via a S2B link 120). Specifically, the state 342 may relate to whether the secondary audio bud 115 is being used or whether the secondary audio bud 115 is open to be connected with the UTP Bluetooth connection with the primary audio bud 110. In performing this operation, the advertisement 334 that is received may include information as to whether the secondary audio bud 115 is being used with another source device.

With the notification 340, the controller 310 may also provide an instruction 344 that indicates that the BLE advertisement 322 and the BLE scan 324 are to be terminated. Likewise, the controller 310 may further issue an instruction 346 that indicates that the Bluetooth page scheme is to be used. Accordingly, the primary audio bud 110 may initiate the BT page operation where a BT page 348 may be transmitted. As noted above, the BT page 348 may be performed based on the R1 page scan mode or on a modified manner of transmission. For illustrative purposes, the BT page 348 may be transmitted using the R1 page scan mode in which 128 pages are transmitted over a period of 1.28 seconds. It is noted that since these processes (e.g., 340-346) are performed internally within the primary audio bud 110, the amount of time necessary to perform these operations may be negligible.

On the side of the secondary audio bud 115, after the primary audio bud 110 has received the BLE advertisement 334, the primary audio bud 110 may transmit a scan request 338 that includes state information of the primary audio bud 110. The secondary audio bud 115 may receive the scan request 338 and exchange a notification 350 between the baseband processor 315 and the controller 320. Specifically, the notification 350 may indicate that the BLE advertisement 334 has been received by the primary audio bud 110 and the identification of each other has been determined using the advertisement scheme. Based on the notification 350, the secondary audio bud 115 may resolve the state 352. In a substantially similar manner as resolving the state 342 by the primary audio bud 110, the secondary audio bud 115 may determine whether the primary audio bud 110 is being used with a time sensitive application over the S2B link 120. An indication may be included in the scan request 338. If the indication is not included in the scan request 338, alternatively, since the source device 105 and the primary audio bud 110 are connected using the S2B link 120, the secondary audio bud 115 may utilize the eavesdrop 130 to resolve the state 352. With the notification 350, the controller 320 may write an address 354. Specifically, the address 354 may be the BD ADDR which uniquely identifies Bluetooth capable devices. The controller 320 may also provide an instruction 356 that indicates that the BLE advertisement 328 and the BLE scan 330 are to be terminated. Likewise, the controller 320 may further issue an instruction 358 that indicates that the Bluetooth page scheme is to be used. Accordingly, the secondary audio bud 115 may initiate the BT page scan operation where a BT page scan 360 may be performed. As noted above, the BT page scan 360 may be performed based on the R1 page scan mode or on a modified manner of transmission. In this instance, based on resolving the state 352, the BT page scan 360 may be dynamically selected. For example, if the state 352 indicates that a time sensitive application is not using the S2B link 120, the instruction 358 may indicate that the BT page scan 360 uses the R1 page scan mode in which a scan is performed for 11.25 ms every 1.28 seconds. However, if the state 352 indicates that a time sensitive application is using the S2B link 120, the instruction 358 may indicate that the BT page scan 360 uses the fast connect scheme in which a plurality of scans is performed every 100 ms. For illustrative purposes, as illustrated, the state 352 may indicate that a time sensitive application is using the S2B link such that the instruction 358 is for the fast connect scheme. Thus, the BT page scan 360 may utilize the settings for the rapid connection procedure such as two scans of 11.25 ms being performed every 100 ms. It is noted that since these processes (e.g., 350-358) are performed internally within the secondary audio bud 110, the amount of time necessary to perform these operations may be negligible.

As noted above, while the advertisement scheme is being used, the BT page 348 may be prevented from being transmitted. However, with the advertisement scheme terminated, the BT page 348 may be allowed to be transmitted from the primary audio bud 110 to the secondary audio bud 115. Again, with the identification of the presence having been determined, the amount of time needed for the BT page operation to successfully be used may be reduced and the power consumption associated with that use may also be reduced.

At a subsequent time, a BT page 362 transmitted from the primary audio bud 110 may be received by the secondary audio bud 115 using a BT page scan 364. With the exchange of the page, the primary audio bud 110 and the secondary audio bud 115 may perform a Bluetooth connection process 366 to establish the B2B link 125. Accordingly, upon establishing the B2B link 125, the baseband processor 305 may provide an indication 368 to the controller 310 that the B2B link 125 is established and the baseband processor 315 may provide an indication 370 to the controller 320 that the B2B link 125 is established. As noted above, with the use of the fast connect scheme, the B2B link 125 may be capable of being established, on average, in 100 ms.

Figure 4:
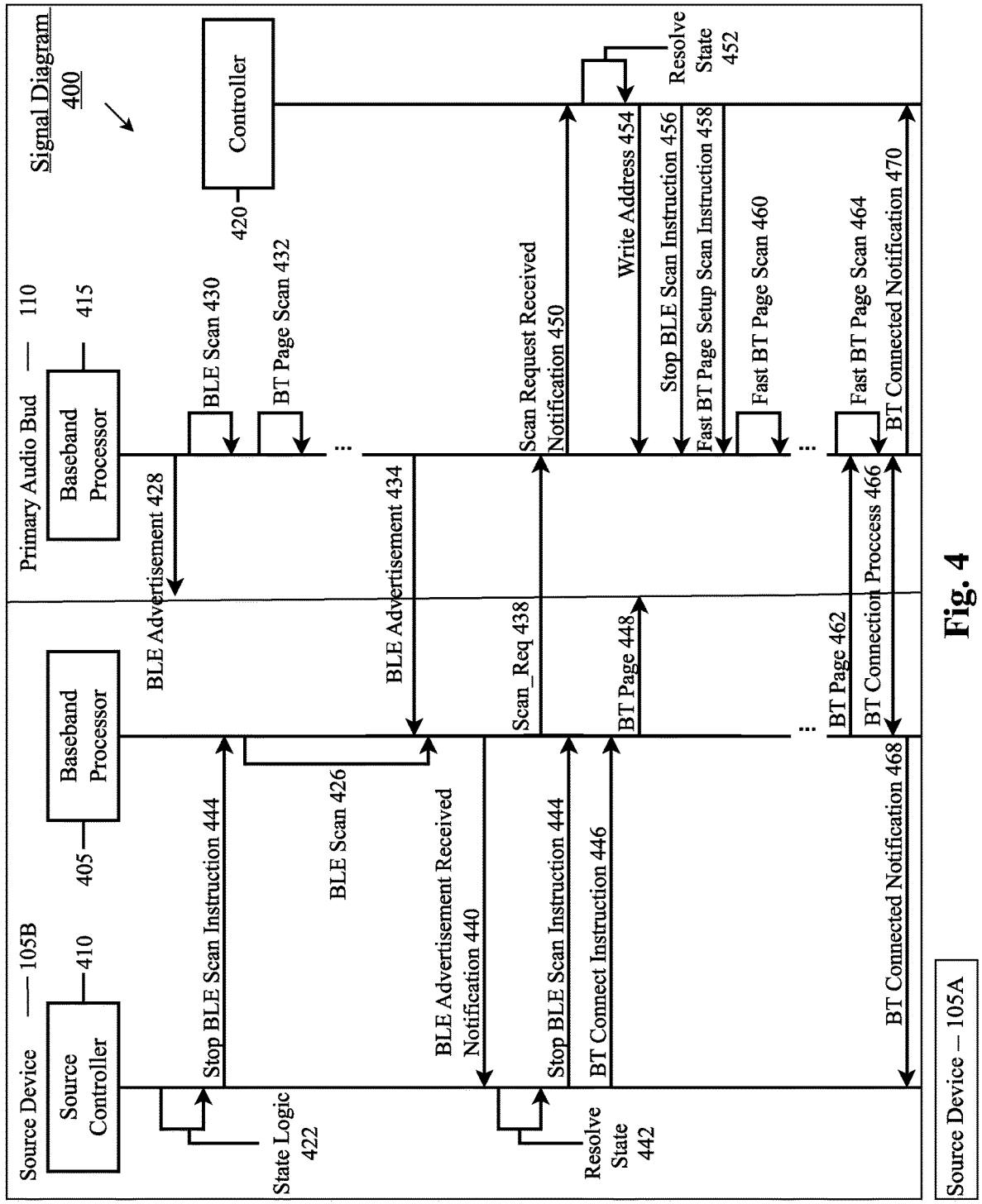
FIG. 4 shows a signal diagram for a second example scenario in which a short-range connection is to be established according to various exemplary embodiments described herein.

FIG. 4 shows a signal diagram 400 for the above noted second scenario where a short-range connection is to be established according to the exemplary embodiments. As described above, one manner of utilizing the mechanism according to the exemplary embodiments is in establishing the S2B link 120. Specifically, the S2B link 120 may be established between one of a plurality of source devices 105A-B and the primary audio bud 110 and/or the secondary audio bud 115. For illustrative purposes, the signal diagram 400 is used to describe a situation in which the S2B link 120 is established between a first source device 105A and the primary audio bud 110 and a determination is made as to whether the S2B link 120 is to be established instead with a second source device 105B and the primary audio bud 110. Thus, the S2B link 120 (e.g., a Bluetooth connection) may not be established with the second source device 105B. However, the use of an already established S2B link 120 with the first source device 105A is only exemplary and the primary audio bud 110 may not be connected to any source device 105A prior to connecting to a second source device 105B. Thus, at a subsequent time or upon an event occurring (e.g., an incoming call), the second source device 105B and the primary audio bud 110 may be capable of establishing the S2B link 120. Specifically, a priority determination may indicate which of the source devices 105A-B that the primary audio bud 110 is to maintain or establish the S2B link 120. When a higher priority between the source devices 105A-B is identified at the appropriate conditions, the exemplary embodiments may be used to establish the S2B link 120 in a timely manner, particularly when the conditions relate to time sensitive applications (e.g., a voice call) are being used on the second source device 105B.

As will be described in further detail below, the exemplary embodiments may be utilized in this second scenario such that a first one of a plurality of Bluetooth capable devices may be capable of sensing at least one second of the plurality of Bluetooth capable devices when within an operating capability of one another. The Bluetooth capable devices may further identify whether a priority exists such that the S2B link 120 should be established between the two Bluetooth capable devices having the highest priority. The exemplary embodiments may utilize the priority for the proper S2B link 120 to be established in a timely manner based on the current conditions. For example, music may be streaming from a first source device 105A (e.g., a laptop) to the primary audio bud 110 (as well as to the secondary audio bud 115 via the B2B link 125 or through the eavesdrop 130). At a subsequent time, an incoming call may arrive at a second source device 105B (e.g., a mobile phone). The second source device 105B may have detected the presence of the primary audio bud 110 using the mechanism according to the exemplary embodiments. The second source device 105B may also be capable of determining the manner in which the first source device 105A is utilizing the S2B link 120 with the primary audio bud 110 (e.g., whether music is being streamed). By resolving a priority between the S2B link 120 with the second source device 105B or the S2B link with the first source device 105A, the mechanism according to the exemplary embodiments may be used to maintain the S2B link 120 between the first source device 105A and the primary audio bud 110 or establish a new S2B link 120 between the second source device 105B and the primary audio bud 110 and establish the new S2B link 120 in an automated and timely manner.

As shown in the signal diagram 400, the second source device 105B and the primary audio bud 110 may each be represented with components thereof. For example, the source device 105 may be represented with a baseband processor 405 and a source controller 410 while the primary audio bud 110 may be represented with the baseband processor 415 and the controller 420. The baseband processor 405 and the baseband processor 415 may perform operations substantially similar to the baseband processor 215 described above for the device 200 of FIG. 2. The source controller 410 and the controller 420 may perform operations substantially similar to the controller 220 described above for the device 200 of FIG. 2.

Since the second source device 105B is currently not connected to the primary audio bud 110 over the S2B link 120, the second source device 105B may utilize the advertisement scheme when conditions of the second source device 105B become appropriate for its use. Furthermore, although the primary audio bud 110 may already be connected to the first source device 105A over an existing S2B link 120, according to the exemplary embodiments, the primary audio bud 110 may still utilize the advertisement scheme in view of the second scenario. Again, since the advertisement scheme includes low power operations, a continued use even while the S2B link 120 is established between the primary audio bud 110 and the first source device 105A may not be a significant burden on a limited power supply on the primary audio bud 110. Thus, the primary audio bud 110 may perform the BLE advertisement operation. Specifically, the BLE advertisement 428 may be broadcast by the primary audio bud 110. The primary audio bud 110 may also perform the BLE scan operation 430. Furthermore, since a page may be transmitted at any moment, the primary audio bud 110 may also utilize a portion of the Bluetooth paging scheme, by performing the BT page scan operation 432.

The second source device 105B may also perform a plurality of operations. In this instance, the second source device 105B may initially perform a status operation 422 in which a status logic procedure determines whether an application requires the S2B link 120. For example, the second source device 105B may determine that the S2B link 120 may be used to stream audio data to the primary audio bud 110, to stream video data when the primary audio bud 110 is incorporated with a display device, etc. Thus, by utilizing the status operation 422, the second source device 105B may detect an event for which the S2B link 120 may be used. Accordingly, an active indication 424 representing the use of the application may be provided to the baseband processor 405. In contrast to the primary audio bud 110 and the secondary audio bud 115 which are paired to one another such that the B2B link 125 is to be maintained whenever possible, the second source device 105B may only use the S2B link 120 when the current conditions are appropriate. Therefore, the second source device 105B may not be performing the BLE advertisement operation, the BLE scan operation, or the BT page scan operation as a background set of operations. In contrast, upon receiving the active indication 424, the baseband processor 405 may initiate the BLE scan operation 426.

Once the BLE scan 426 is initiated, the second source device 105B may detect the presence of the primary audio bud 110 if one of the BLE advertisements is eventually received. Thus, when the second source device 105B and the primary audio bud 110 are capable of establishing the S2B link 120 (e.g., coming within the operating proximity to each other), the above advertisement scheme may result in an advertisement being received. That is, the second source device 105B and the primary audio bud 110 may identify one another. For example, at a subsequent time, a BLE advertisement 434 may be broadcast by the primary audio bud 110 and received by the second source device 105B using the BLE scan 426.

It is noted that when the second source device 105B initiates the BLE scan 426, the second source device 105B may utilize a time out period or a timer in which to detect the presence of the primary audio bud 110. As no identification procedure has been used and the second source device 105B is not yet aware of whether the primary audio bud 110 may be capable of establishing the S2B link 120, the second source device 105B may utilize the timer to utilize a fallback operation such as using a local component (if available). The timer may be any duration of time to maintain an acceptable user experience. For example, the timer may be 200 to 300 ms of using the BLE scan 426 to potentially receive the BLE advertisement 428. Accordingly, through the use of the timer, at most, the process of using the advertisement scheme may be capped at the selected duration of the timer (e.g., 200 or 300 ms).

Once the BLE advertisement 434 is received by the second source device 105B, a corresponding notification 440 may be exchanged between the baseband processor 405 and the source controller 410. Based on the notification 440, the second source device 105B may resolve a state 442 of the primary audio bud 110. Specifically, the state 442 may relate to whether the primary audio bud 110 has already established or is otherwise using a short-range connection with another source device (e.g., the first source device 105A). An indication may have been included in the BLE advertisement 434. That is, the second source device 105B may determine whether the primary audio bud 110 is currently connected with a S2B link to the first source device 105A (or any other source device). For example, the BLE advertisement 434 or another transmission may include information regarding a potential S2B link already established by the primary audio bud 110. Accordingly, the second source device 105B may first determine whether the primary audio bud 110 is currently connected using the S2B link 120 with the first source device 105A. If there is no connection, the second source device 105B may proceed as described in detail below. However, if the primary audio bud 110 is connected using the S2B link 120 with the first source device 105A, the second source device 105B may determine the type of data being exchanged over the current S2B link 120 between the first source device 105A and the primary audio bud 110. For example, the second source device 105B may also be configured to use the eavesdrop 130 or utilize other available information in performing this determination. Using this determination of the type of data being exchanged over the current S2B link 120 and comparing to the data to be exchanged if the S2B link 120 were to be established between the second source device 105B and the primary audio bud 110, the second source device 105B may determine a priority. If the current data being exchanged between the first source device 105A and the primary audio bud 110 has a higher priority, the second source device 105B may terminate any further attempt at establishing the S2B link 120 with the primary audio bud 110. Accordingly, the second source device 105B may stream the data to a local component (e.g., local speakers if audio data is to be streamed). In contrast, if the data to be exchanged between the second source device 105B and the primary audio bud 110 has a higher priority, the second source device 105B may proceed as described in detail below.

If the second source device 105B is to proceed with establishing the S2B link 120 with the primary audio bud 110, with the notification 440, the source controller 410 may provide an instruction 444 that indicates that the BLE scan 426 is to be terminated. The source controller 410 may further issue an instruction 446 that indicates that the Bluetooth page scheme is to be used. Accordingly, the second source device 105B may initiate the BT page operation where a BT page 448 may be transmitted. Even with the state 442 being resolved internally and externally, the operations performed by the source controller 410 may utilize a time that is negligible.

On the side of the primary audio bud 110, after the second source device 105B has received the BLE advertisement 434, the second source device 105 may transmit the scan request 438 that include state information such as the type of data to be exchanged over the short-range connection if established. The primary audio bud 110 may receive the scan request 438 and exchange a notification 450 between the baseband processor 415 and the controller 420. Specifically, the notification 450 may indicate that the BLE advertisement 434 has been received by the second source device 105B and the identification of each other has been determined using the advertisement scheme. Based on the notification 450, the primary audio bud 110 may resolve the state 452. In this instance, the primary audio bud 110 may determine the type of data to be exchanged if the S2B link 120 were established with the second source device 105B. Based on this determination, the type of BT page scan operation may be identified.

With the notification 450, the controller 420 may write an address 454. The controller 420 may also provide an instruction 456 that indicates that the BLE advertisement 428 and the BLE scan 430 are to be terminated. The controller 420 may further issue an instruction 458 that indicates that the Bluetooth page scheme is to be used. Accordingly, the primary audio bud 110 may initiate the BT page scan operation where a BT page scan 460 may be performed. As noted above, the BT page scan 460 may be performed based on the R1 page scan mode or on a modified manner of transmission. In this instance, based on the type of data to be exchanged by the second source device 105B over the potential S2B link 120, the BT page scan 360 may be dynamically selected. For example, if the type of data is not for a time sensitive application, the instruction 458 may indicate that the BT page scan 460 uses the R1 page scan mode. However, if the type of data is for a time sensitive application, the instruction 458 may indicate that the BT page scan 460 uses the fast connect scheme. For illustrative purposes, as illustrated, the type of data may indicate that a time sensitive application will be using the S2B link with the second source device 105B such that the instruction 458 is for the fast connect scheme. Thus, the BT page scan 460 may utilize the settings for the rapid connection procedure.

At a subsequent time, a BT page 462 transmitted from the second source device 105B may be received by the primary audio bud 110 using the BT page scan 464. With the exchange of the page, the second source device 105B and the primary audio bud 110 may perform a Bluetooth connection process 466 to establish the S2B link 120. Accordingly, upon establishing the S2B link 120, the baseband processor 405 may provide an indication 468 to the source controller 410 that the S2B link 120 is established and the baseband processor 415 may provide an indication 470 to the controller 420 that the S2B link 120 is established.

It is noted that when the primary audio bud 110 already had a current S2B link 120 with the first source device 105A, the primary audio bud 110 may utilize further operations in the teardown of the current S2B link 120 to establish the new S2B link 120. For example, a timer may be used for the BT page scan 460. That is, the primary audio bud 110 may listen for the page from the second source device 105B for a limited amount of time. Since the second source device 105B may determine that the data to be exchanged by the second source device 105B does not take precedence (e.g., lower priority than the current exchanged data), as described above, the second source device 105B may terminate the process and not transmit a page. Thus, instead of extending the BT page scan 460, particularly if the fast connect scheme is being used, the second source device 105B may terminate the BT page scan 460.

As described in detail above, the exemplary embodiments provide a first manner of reducing the time required to establish a Bluetooth connection. Specifically, the advertisement scheme may reduce the amount of time needed for Bluetooth capable devices to identify one another. By using low power operations that are performed in a more aggressive manner, the Bluetooth capable devices may identify one another in a reduced amount of time. For example, in the first scenario, the advertisement scheme may only use 1.5 seconds while in the second scenario, the advertisement scheme may only use 200 to 300 ms. The exemplary embodiments provide a second manner of reducing the time required to establish the Bluetooth connection. Specifically, the fast connect scheme may be used to reduce the amount of time needed for Bluetooth capable devices that have identified one another to establish the Bluetooth connection. By using a more aggressive Bluetooth page scheme in which more BT scan operations are performed in a reduced time frame, a Bluetooth page may be received in a significantly reduced amount of time for the Bluetooth connection to be established. For example, in the first or scenario, the fast connect scheme may only use 100 ms. With negligible processing times, the first scenario may only require 1.6 seconds while the second scenario may only require 300 to 400 ms. As those skilled in the art will understand, the amount of time that is needed to establish the Bluetooth connection may be reduced by half.

Figure 5:
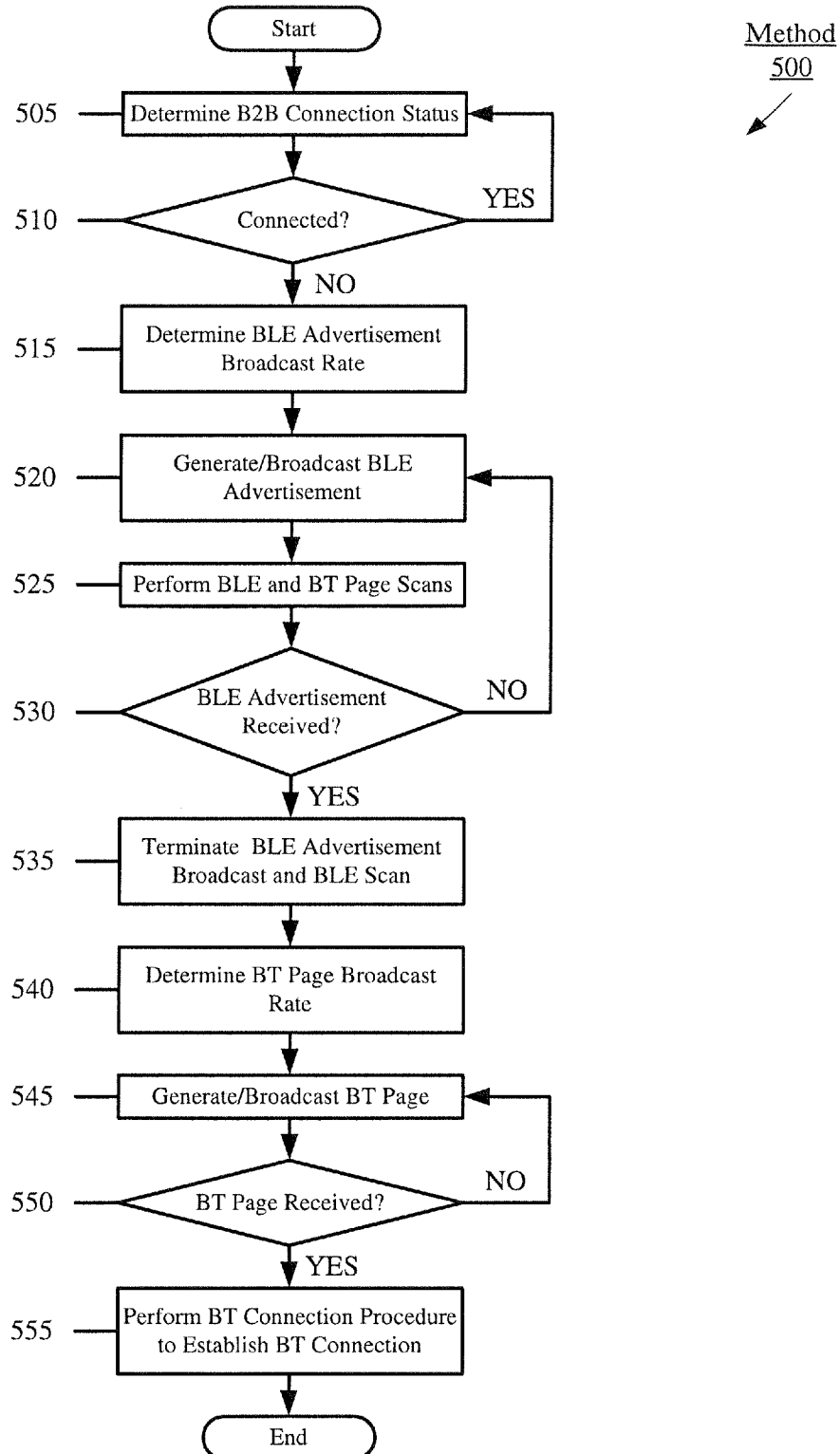
FIG. 5 shows an example method for establishing a short-range connection by a first device in the first scenario of FIG. 3 according to various exemplary embodiments described herein.

FIG. 5 shows a method 500 for establishing a short-range connection by a first device in the first scenario of FIG. 3 according to the exemplary embodiments. Specifically, the method 500 relates to utilizing the advertisement scheme and the fast connect scheme (when appropriate) to reduce the amount of time in establishing a Bluetooth connection between the primary audio bud 110 and the secondary audio bud 115. That is, the method 500 relates to creating the B2B link 125. The method 500 will be described from the perspective of the primary audio bud 110 in establishing the B2B link 125 under the first scenario. For illustrative purposes, it may be assumed that the primary audio bud 110 has established a S2B link 120 with the source device 105.

In 505, the primary audio bud 110 determines the status of the connection with the paired secondary audio bud 115. Specifically, the primary audio bud 110 determines whether the B2B link 125 with the secondary audio bud 115 is established. As noted above, there may be a variety of reasons why the B2B link 125 may not be established. For example, the B2B link 125 may not have been previously established. In another example, the B2B link 125 may have been established but the secondary audio bud 110 may be incapable of maintaining the B2B link 125 (e.g., the primary audio bud 110 was moved away from the secondary audio bud 115). Thus, in 510, the primary audio bud 110 determines if the B2B link 125 is currently established. If the B2B link 125 is currently established, the primary audio bud 110 returns to 505.

If the B2B link 125 is not established, in 515, the primary audio bud 110 determines how the BLE advertisement operation is to be used. As noted above, as a background operation, the advertisement scheme may be used. Accordingly, the BLE advertisement operation may utilize a specific rate at which BLE advertisements are broadcast. As noted above, one manner of broadcasting the BLE advertisements is every 181 ms. Thus, in 520, the primary audio bud 110 may generate and broadcast the BLE advertisements. In light of the advertisement scheme being used, in 525, the primary audio bud 110 also performs the BLE scan operation. As noted above, one manner of performing the BLE scan operations is to perform a BLE scan for 10 ms every 100 ms. Furthermore, as defined by Bluetooth protocols, the primary audio bud 110 may also perform the BT page scan operation since a page may be transmitted at any given moment by another Bluetooth capable device. As noted above, when using the R1 page scan mode, one manner of performing the Bluetooth page scan operation is to perform a BT page scan for 11.25 ms every 1.28 seconds.

In 530, the primary audio bud 110 determines whether a BLE advertisement being broadcast by the secondary audio bud 115 has been received during one of the BLE scans. If no BLE advertisement has been received, the primary audio bud 110 may return to 520 and 525 where the BLE advertisement operation, the BLE scan operation, and the BT page scan operation are continued to be performed. However, if the BLE advertisement has been received, the primary audio bud 110 continues to 535. As noted above, a series of signals and notifications may be used to terminate a first set of operations while initiating a second set of operations. Specifically, in 535, the primary audio bud 110 may terminate the advertisement scheme by stopping the BLE advertisement operation and the BLE scan operation.

In 540, the primary audio bud 110 determines how the BT page operation is to be performed. Upon receiving the BLE advertisement, the primary audio bud 110 may initiate the next phase of establishing the B2B link 125. Specifically, the Bluetooth page scheme may be used. However, according to the exemplary embodiments, the Bluetooth page scheme may be used in a conventional manner or in a modified manner. Although the BT page operation may utilize known mechanisms, as noted above, the BT page operation may also be modified. For example, a known mechanism may be to transmit a page every 10 ms such that with the R1 page scan mode, 128 pages are transmitted over 1.28 seconds. However, the exemplary embodiments may be configured to modify this rate such that more pages are transmitted over the same time period. Thus, in 545, the primary audio bud 110 generates and broadcasts the page.

In 550, the primary audio bud 110 determines whether the page was received by the secondary audio bud 110. For example, upon receipt of the page, the secondary audio bud 110 may provide a response. The response may be substantially similar to the response used in conventional Bluetooth page schemes. If no page was received, the primary audio bud 110 may return to 545 to continue transmitting the page. However, if the page was received, in 555, the primary audio bud 110 performs the connection procedure to establish the B2B link 125 with the secondary audio bud 110.

Figure 6:
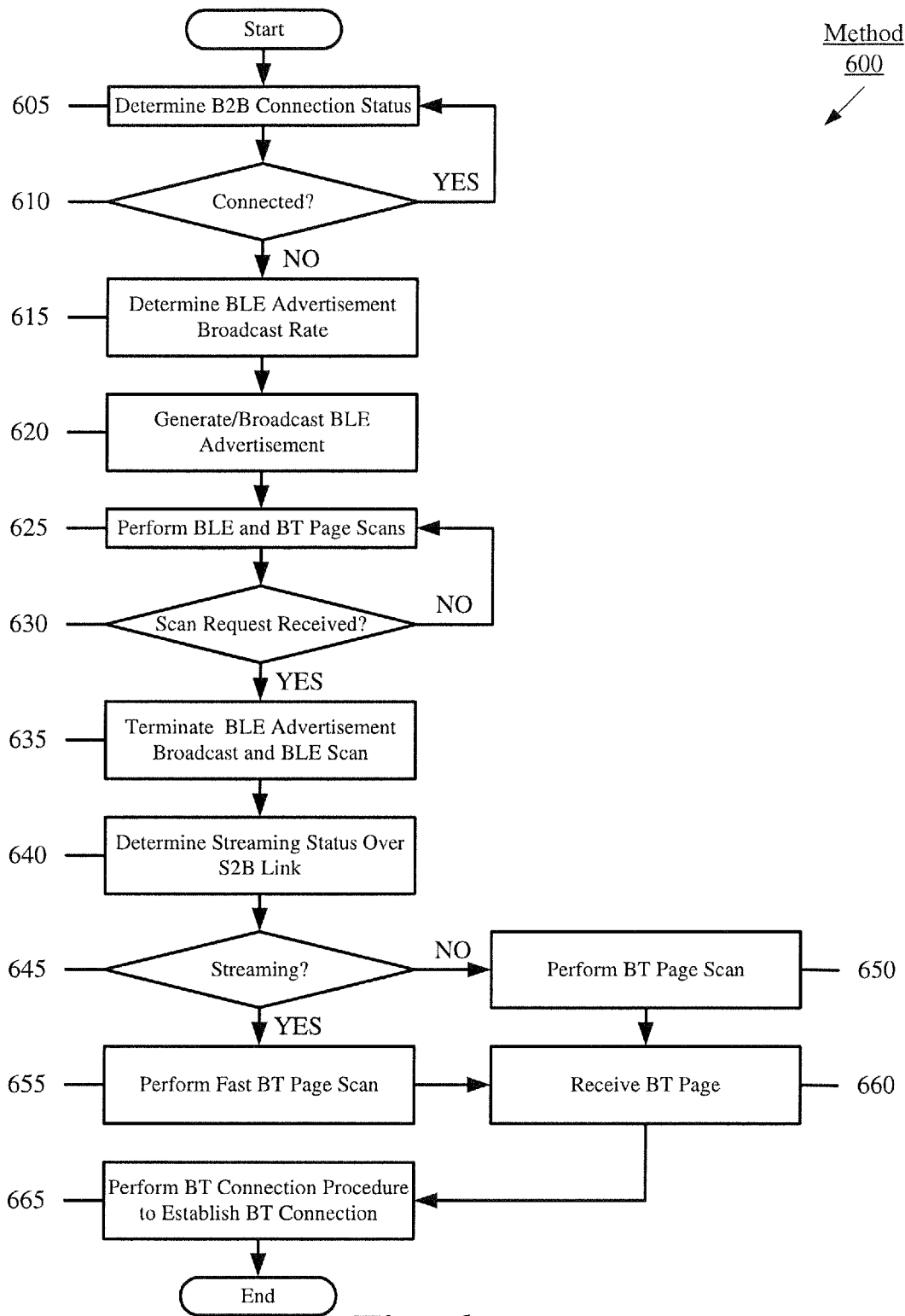
FIG. 6 shows an example method for establishing a short-range connection by a second device in the first scenario of FIG. 3 according to various exemplary embodiments described herein.

FIG. 6 shows a method 600 for establishing a short-range connection by a second device in the first scenario of FIG. 3 according to the exemplary embodiments. Specifically, the method 600 relates to utilizing the advertisement scheme and the fast connect scheme (when appropriate) to reduce the amount of time in establishing a Bluetooth connection between the primary audio bud 110 and the secondary audio bud 115. That is, the method 600 relates to creating the B2B link 125. The method 600 will be described from the perspective of the secondary audio bud 115 in establishing the B2B link 125 under the first scenario. For illustrative purposes, it may be assumed that the primary audio bud 110 has established a S2B link 120 with the source device 105.

Initially, the secondary audio bud 115 is in a substantially similar position as the primary audio bud 110 with regard to maintaining or establishing the B2B link 125. Thus, 605-625 may be substantially similar to 505-525 of the method 500 of FIG. 5 for the primary audio bud 110. However, in 630, since the primary audio bud 110 is the side that receives the BLE advertisement being broadcast by the secondary audio bud 115 to achieve the identification of one another, the secondary audio bud 115 may determine whether a scan request is received in response to a BLE advertisement being received by the primary audio bud 110. If no scan request has been received, the secondary audio bud 115 may return to 620 and 625 where the BLE advertisement operation, the BLE scan operation, and the BT page scan operation are continued to be performed. However, if the scan request has been received, the secondary audio bud 115 continues to 635. As noted above, a series of signals and notifications may be used to terminate a first set of operations while initiating a second set of operations. Specifically, in 635, the secondary audio bud 115 may terminate the advertisement scheme by stopping the BLE advertisement operation and the BLE scan operation.

In 640, the secondary audio bud 115 determines a streaming status over the S2B link 120 between the source device 105 and the primary audio bud 110. As noted above, the secondary audio bud 115 may use the eavesdrop 130 to determine how the S2B link 120 is being utilized. Accordingly, the secondary audio bud 115 may resolve a status of the S2B link 120. Specifically, the secondary audio bud 115 may determine whether the S2B link 120 is being used for a time sensitive application. As noted above, based on the type of use of the S2B link 120 at the time the B2B link 125 is being processed for establishment, the secondary audio bud 110 may correspondingly select the type of BT page scan operation to use.

In 645, the secondary audio bud 115 determines whether the S2B link 120 is used for streaming, a real-time use, or a time sensitive application. If the S2B link 120 is not being used for a time sensitive application, in 650, the secondary audio bud 115 selects a conventional approach to using the BT page scan operation. Specifically, for a R1 page scan mode, a BT page scan may be performed for 11.25 ms every 1.28 seconds. However, if the S2B link 120 is being used for a time sensitive application, in 655, the secondary audio bud 115 selects the rapid connection procedure for the BT page scan operation. Specifically, a BT page scan may be performed a plurality of times (e.g., twice), each for 11.25 ms, within a 100 ms time interval. After 650 or 655, in 660, using the BT page scan operation, the secondary audio bud 115 may receive the page being transmitted by the primary audio bud 115. Accordingly, in 665, the secondary audio bud 115 performs the connection procedure to establish the B2B link 125 with the primary audio bud 115.

Figure 7:
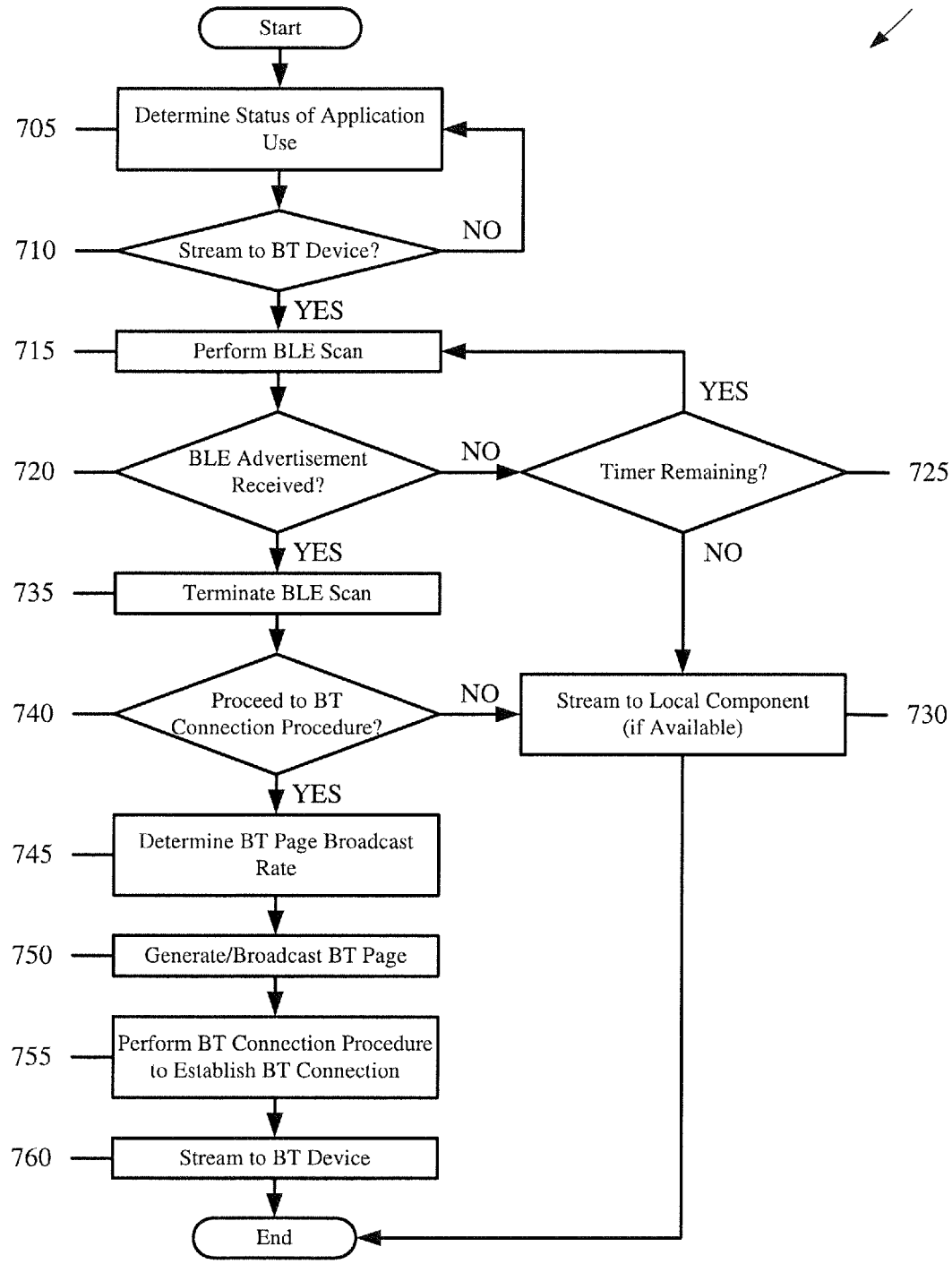
FIG. 7 shows an example method for establishing a short-range connection by a first device in the second scenario of FIG. 4 according to various exemplary embodiments described herein.

FIG. 7 shows a method 700 for establishing a short-range connection by a first device in the second scenario of FIG. 4 according to the exemplary embodiments. Specifically, the method 700 relates to utilizing the advertisement scheme and the fast connect scheme (when appropriate) to reduce the amount of time in establishing a Bluetooth connection between the second source device 105B and the primary audio bud 110. That is, the method 700 relates to creating the S2B link 120. Again, the primary audio bud 110 may already be connected over a current S2B link 120 with a first source device 105A. The method 700 may be directed to establishing a new S2B link 120 with the second source device 105B. The method 700 will be described from the perspective of the second source device 105B in establishing the S2B link 120 under the second scenario.

In 705, the second source device 105B may determine a status of use of its applications. Specifically, the second source device 105B may detect when an event has occurred that triggers the operations of the method 700. The second source device 105B may be executing a plurality of applications and/or operations that may utilize one or more components of the second source device 105B. In one manner, one of the applications may require or select a use of a remote Bluetooth capable device (e.g., the primary audio bud 110) that would use a new S2B link 120. For example, the application may be an audio streaming service in which music data is streamed to the primary audio bud 110 for output of corresponding music thereon. In another example, the application may be a voice call operation in which incoming audio associated with the voice call is output on the primary audio bud 110. Thus, in 710, the second source device 105B determines whether the status of the applications uses a stream to a Bluetooth capable device. If no stream is to be used, the second source device 105B may return to 705 to continue monitoring the status of applications.

If a stream is to be used, the second source device 105B continues to 715. As the second source device 105B now needs to identify available Bluetooth capable devices, in 715, the second source device 105B may perform a BLE scan. As described above, the BLE scan may be performed in a substantially similar manner as the BLE scans in identifying the audio buds to establish the B2B link 125. However, the 10 ms BLE scan every 100 ms time interval may be used to consider power consumption in performing the BLE can operation. In another exemplary embodiment, the power consideration of the second source device 105B may not be as stringent as the primary audio bud 110. Thus, the second source device 105B may utilize a continuous BLE scan operation in which a BLE scan is constantly being performed over a period of time or until a BLE advertisement is detected. Thus, in 720, the second source device 105B determines if a BLE advertisement has been received. If no BLE advertisement is received, the second source device 105B continues to 725. In 725, the second source device 105B determines whether a time period in which to perform the continuous BLE scan operation has ended. If there is remaining time in this scanning time period, the second source device 105B returns to 715 to maintain performing the BLE scan operation. However, if the scanning time period has ended, the second source device 105B may conclude that there is no available Bluetooth capable device within capability of establishing the S2B link 120. Accordingly, the second source device 105B continues to 730 where a local component is selected (if available) to stream the data from the identified application in 705.

Returning to 720, if the second source device 105B receives a BLE advertisement, the second source device 105B continues to 735. In 735, the second source device 105B may initially terminate the BLE scan operation. Then in 740, the second source device 105B may determine whether to proceed to establishing the S2B link 120 with the primary audio bud 110. Specifically, the second source device 105B may first determine whether the primary audio bud 110 is an unconnected Bluetooth capable device (e.g., not currently connected to the first source device 105A over a current S2B link 120) or is already connected to another Bluetooth capable device (e.g., established a current S2B link 120 with the first source device 105A). If the second source device 105B determines that the primary audio bud 110 is an unconnected Bluetooth capable device, the second source device 105B may continue to 745. If the second source device 105B determines that the primary audio bud 110 has established the current S2B link 120 with the first source device 105A, the second source device 105B may determine whether the current data being exchanged over the current S2B link 120 has a priority over the data to be exchanged with a new S2B link 120 that may be established between the primary audio bud 110 and the second source device 105B. As noted above, the second source device 105B may use any available information to make this determination (e.g., use an eavesdrop 130). If the data to be exchanged has a priority over the current data that is being exchanged, the second source device 105B may continue to 745. However, if the current data being exchanged has a priority over the data to be exchanged, the second source device 105B may continue to 730 where a local component is selected.

Returning to 745 where the primary audio bud 110 is an unconnected Bluetooth capable device or the data to be exchanged has a priority, the second source device 105B may determine how the BT page operation is to be performed. As noted above, the BT page operation may utilize a conventional transmission rate in which, under the R1 page scan mode, 128 pages are transmitted over 1.28 seconds. However, since the second source device 105B may not have as strict a consideration for power consumption, the second source device 105B may utilize a more aggressive page rate in performing the BT page operation (if available). Thus, in 750, the second source device generates and transmits the page. In 755, upon determining that the primary audio bud 110 has received the page, the second source device 105B may perform a Bluetooth connection procedure to establish the S2B link 120 such that in 760, data may be streamed from the second source device 105B to the primary audio bud 110.

Figure 8:
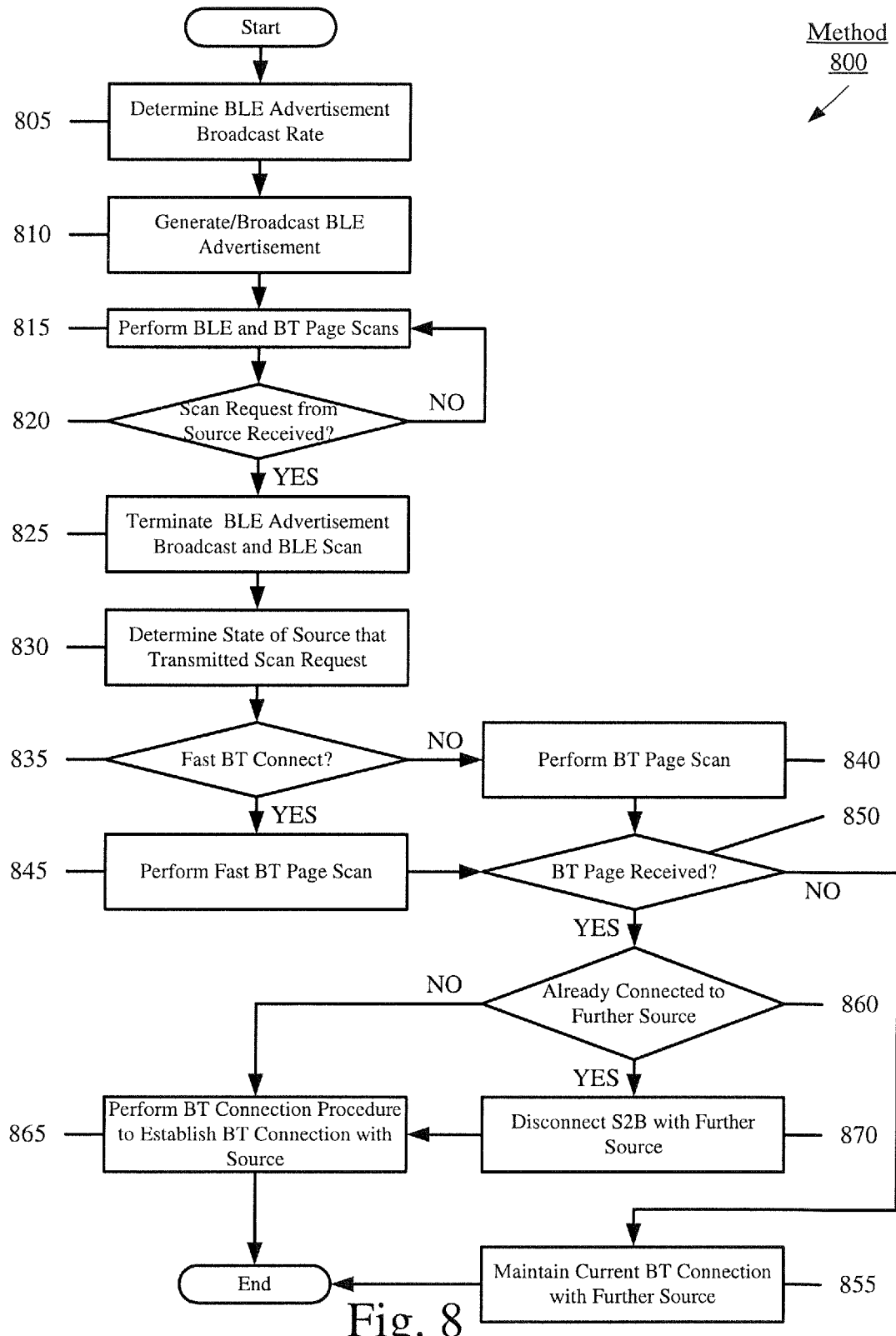
FIG. 8 shows an example method for establishing a short-range connection by a second device in the second scenario of FIG. 4 according to various exemplary embodiments described herein.

FIG. 8 shows a method 700 for establishing a short-range connection by a second device in the second scenario of FIG. 4 according to the exemplary embodiments. Specifically, the method 800 relates to utilizing the advertisement scheme and the fast connect scheme (when appropriate) to reduce the amount of time in establishing a Bluetooth connection between the second source device 105B and the primary audio bud 110. That is, the method 800 relates to creating the S2B link 120. The method 800 will be described from the perspective of the primary audio bud 110 in establishing the S2B link 120 under the second scenario.

Initially, the primary audio bud 110 of the second scenario is in a substantially similar position as the secondary audio bud 115 in the first scenario. Thus, 805-820 may be substantially similar to 805-825 may be substantially similar to 615-635 of the method 600 of FIG. 6 for the secondary audio bud 115. However, in 830, since the primary audio bud 110 is determining whether a S2B link 120 is to be established with the second source device 105B which was identified using the advertisement scheme in 805-825, the primary audio bud 110 may determine a state of the second source device 105B that transmitted a scan request in response to having received the BLE advertisement broadcast by the primary audio bud 110. Specifically, the state of the second source device 105B may be resolved to determine the type of data to be exchanged if the S2B link 120 is to be established with the second source device 105B. As noted above, the type of data to be exchanged may indicate whether a conventional BT page scan operation is to be used or the rapid connection procedure of the fast connection scheme is to be used. It is again noted that the primary audio bud 110 may use any available information in resolving the state of the second source device 105B.

In 835, the primary audio bud 110 may determine whether the fast connection scheme is to be used based on the state of the second source device 105B. If a conventional BT page scan operation is to be used, in 840, the primary audio bud 110 may perform BT page scans for 11.25 ms every 1.28 seconds. However, if the fast connection scheme is to be used, in 845, the primary audio bud 110 may perform a plurality of BT page scans, each of 11.25 ms, every 100 ms.

In 850, the primary audio bud 110 determines whether a page was received from the second source device 105B. As noted above, the second source device 105B may select whether to proceed with establishing the new S2B link 120 with the primary audio bud 110, for example, based on a priority. If the second source device 105B selects not to establish the new S2B link 120, the second source device 105B may not transmit a page. Thus, the primary audio bud 110 may not receive a page. When no page is received, the primary audio bud 110 continues to 855 where the primary audio bud 110 remains an unconnected Bluetooth capable device or maintains use of the current S2B link with the first source device 105A.

Returning to 850, if the primary audio bud 110 has received a page from the second source device 105B, in 860, the primary audio bud 110 determines whether there is a current S2B link 120. As noted above, the primary audio bud 110 may be an unconnected Bluetooth capable device or may have established a current S2B link 120 with the first source device 105A. If the primary audio bud 110 is an unconnected Bluetooth capable device, the primary audio bud 110 may continue to 865 where the Bluetooth connection procedure is performed to establish the S2B link with the second source device 105B. However, if the primary audio bud 110 has established a current S2B link 120 with the first source device 105A, the primary audio bud 110 continues to 870 where the primary audio bud 110 performs a teardown operation for the current S2B link 120 with the first source device 105A. Subsequently, the primary audio bud 110 continues to 865 where the Bluetooth connection procedure is performed to establish the S2B link with the second source device 105B.

It is noted that the operations described above with the methods 500, 600, 700, and 800 are only exemplary. That is, these methods 500-800 may include further steps. For example, even after the primary audio bud 110 and the secondary audio bud 115 have terminated the advertisement scheme (e.g., 535, 635, 825), the methods 500, 600, 800 may include a further operation where upon establishing the Bluetooth connection (e.g., 555, 665, 865), the primary audio bud 110 and the secondary audio bud 115 may resume using the advertisement scheme. Furthermore, in the methods 500, 600, 800, the primary audio bud 110 and the secondary audio bud 115 may resume using the conventional BT page scan operation (e.g., the rate at which the BT page scans are performed), particularly if the fast connection scheme was selected for use.

In another example, the methods 500-800 may incorporate a timer operation in a variety of manners. In a first example, in the method 500, a timer operation may be performed while determining if a page was received by the secondary audio bud 115 (e.g., 550). Accordingly, since the BT page operation is relatively power consuming, the primary audio bud 110 may utilize the BT page operation (particularly if a more aggressive approach is used) for a limited amount of time. If the page was not received in the allotted time, the primary audio bud 110 may attempt to establish the B2B link 125 at a later time (e.g., a resting time period). In a second example, in the method 600 or 800, a timer operation may be included with performing the BT page scan operation (e.g., 650, 655, 840, or 845). Specifically, if the fast connection scheme is used (e.g., 655 or 845), the amount of power that is used may be greater than what would otherwise be used with the conventional BT page scan operation. Thus, the timer may provide a window in which the BT page scan operation is performed. In a similar manner as the first example, the secondary audio bud 110 may attempt to establish the B2B link 125 at a later time (e.g., a resting time period).

It is again noted that the exemplary embodiments described above being directed to Bluetooth connections and incorporating BLE features is only exemplary. Accordingly, aspects associated with the Bluetooth connection and BLE features are also only exemplary such as the timing in which operations are performed (e.g., BLE advertisements being broadcast, BLE scans being performed, etc.) as well as the timing in which operations may be completed (e.g., approximately 1.5 seconds for the BLE connection in the first scenario and approximately 200 ms for the BLE connection in the second scenario). The exemplary embodiments may be utilized for any connection and incorporate features of a broadcast/scanning operation.

The exemplary embodiments provide a device, system, and method for a short-range communication pathway. Specifically, a Bluetooth connection may be established between Bluetooth capable devices in an automated and timely manner. By utilizing an advertisement scheme in which BLE features are incorporated to identify when Bluetooth capable devices are within range of establishing the Bluetooth connection, the time required in establishing the Bluetooth connection may be reduced relative to using conventional Bluetooth connection mechanisms (particularly a manual approach). By further utilizing a fast connection scheme in which a more aggressive BT page operation and/or BT page scan operation is used, the time required in establishing the Bluetooth connection may be further reduced.

It will be apparent to those skilled in the art that various modifications may be made in the present disclosure, without departing from the spirit or scope of the disclosure. Thus, it is intended that the present disclosure cover the modifications and variations of this disclosure provided they come within the scope of the appended claims and their equivalents.

What is claimed is:

1. A method, comprising:
   at a wireless audio output device having a first connection to a first audio source device:
   receiving, from a second audio source device, a wireless advertisement comprising an event indication;
   comparing a first priority of an operation related to the first connection and a second priority of an operation related to the event indication; and
   determining, based on the comparing, whether to maintain the first connection.

2. The method of claim 1, further comprising:
   when the second priority is lower than the first priority, maintaining the first connection to the first audio source device.

3. The method of claim 1, further comprising:
   when the second priority is higher than the first priority, terminating the first connection; and
   establishing a second connection with the second audio source device.

4. The method of claim 3, wherein establishing the second connection comprises determining a type of scan to be used based on at least the event indication.

5. The method of claim 1, wherein the first priority is associated with a type of data provided via the first connection and the second priority is associated with a type of data related to the event indication.

6. The method of claim 5, wherein the type of data related to the event indication comprises a voice call.

7. The method of claim 6, wherein the voice call comprises a highest priority type of data, wherein the first connection is terminated and a second connection is established with the second audio source device to handle the voice call.

8. The method of claim 5, wherein the type of data provided via the first connection comprises streaming audio.

9. The method of claim 1, wherein a preprogrammed user preference on one of the first audio source device or the second audio source device has a highest priority, wherein the preprogrammed user preference is provided to the wireless audio output device.

10. A method, comprising:
    at a first source device:
    receiving an event;
    determining a first priority of the event;
    determining a wireless audio output device is performing a streaming operation with a second source device;
    determining a second priority of the streaming operation between the wireless audio output device and the second source device; and
    when the first priority is higher than the second priority, broadcasting an advertisement including an event indication corresponding to the event, wherein the advertisement indicates that the first source device is available to connect to the wireless audio output device.

11. The method of claim 10, further comprising:
    establishing a connection with the wireless audio output device based on at least the advertisement; and
    performing a streaming operation associated with the event with the wireless audio output device.

12. The method of claim 11, wherein establishing the connection is further based on a type of scan associated with the event indication.

13. The method of claim 10, wherein the first priority is associated with a type of data provided via the streaming operation and the second priority is associated with a type of data related to the event.

14. The method of claim 13, wherein the type of data related to the event comprises a voice call.

15. The method of claim 13, wherein the type of data provided via the streaming operation comprises streaming audio.

16. The method of claim 10, further comprising:
    storing a preprogrammed user preference on the first source device as to a type of data that has a highest priority.

17. A baseband processor of a wireless audio output device configured to perform operations comprising:
    establishing a first connection with a first audio source device;
    receiving, from a second audio source device, a wireless advertisement comprising an event indication;
    comparing a first priority of an operation related to the first connection and a second priority of an operation related to the event indication; and
    determining, based on the comparing, whether to maintain the first connection.

18. The baseband processor of claim 17, wherein the operations further comprise:
    when the second priority is lower than the first priority, maintaining the first connection to the first audio source device.

19. The baseband processor of claim 17, wherein the operations further comprise:
    when the second priority is higher than the first priority, terminating the first connection; and
    establishing a second connection with the second audio source device.

20. The baseband processor of claim 19, wherein establishing the second connection comprises determining a type of scan to be used based on at least the event indication.

* * * * *